(12) United States Patent
Bevers et al.

(10) Patent No.: US 7,137,400 B2
(45) Date of Patent: Nov. 21, 2006

(54) BYPASS LOOP GAS FLOW CALIBRATION

(75) Inventors: William Daniel Bevers, Orlando, FL (US); Robert Francis Jones, Clermont, FL (US); Bennett J. Ross, Merritt Island, FL (US); Joseph William Buckfeller, Windermere, FL (US); James L. Flack, Oviedo, FL (US)

(73) Assignee: Agere Systems Inc., Allentown, PA (US)

( * ) Notice: Subject to any disclaimer, the term of this patent is extended or adjusted under 35 U.S.C. 154(b) by 236 days.

(21) Appl. No.: 10/675,569

(22) Filed: Sep. 30, 2003

(65) Prior Publication Data
US 2005/0067021 A1    Mar. 31, 2005

(51) Int. Cl.
*G01F 25/00* (2006.01)
*G05D 7/06* (2006.01)

(52) U.S. Cl. .................... 137/1; 137/486; 137/487.5; 73/1.16; 702/100

(58) Field of Classification Search ............... 137/486, 137/487.5, 599.11, 599.13; 73/1.16, 1.35; 702/100, 50
See application file for complete search history.

(56) References Cited

U.S. PATENT DOCUMENTS

| 5,684,245 | A | * | 11/1997 | Hinkle ................. 73/1.35 |
| 5,744,695 | A | * | 4/1998 | Forbes ................. 73/1.35 |
| 5,865,205 | A | * | 2/1999 | Wilmer ................. 137/2 |
| 5,975,126 | A | * | 11/1999 | Bump et al. .......... 137/487.5 |
| 6,119,710 | A | * | 9/2000 | Brown ................. 137/14 |
| 6,273,954 | B1 | * | 8/2001 | Nishikawa et al. ...... 118/692 |
| 6,332,348 | B1 | * | 12/2001 | Yelverton et al. ....... 73/1.34 |

* cited by examiner

*Primary Examiner*—Ramesh Krishnamurthy (57) ABSTRACT

Described herein are apparatuses, methods and systems to monitor the performance of one or more mass flow controllers that supply gases to deposition, etching, and other manufacturing processes. A bypass loop is provided in fluid connection from either the process line or the vent line. In the bypass loop is a flow detector, such as a digitized mass flow controller. The flow detector takes one or more measurements of flow of gas from a mass flow controller, and data from such one or more measurements is used to provide information about the accuracy and/or precision of the mass flow controller. Also disclosed are ways to correct for back pressure or back vacuum in the process line.

13 Claims, 3 Drawing Sheets

BYPASS LOOP GAS FLOW CALIBRATION

FIELD OF THE INVENTION

This invention relates to gas flow controllers and more particularly, to an apparatus, method and a system to monitor the performance of one or more mass flow controllers that supply gases to deposition, etching, and other manufacturing processes.

BACKGROUND OF THE INVENTION

Numerous industrial processes require accurate and precise control over the flow of different gases. Many of such processes require accurate and precise control over the quantity or mass of gas flowing into a process chamber at different time periods during the process. Examples of such processes include, without being limiting, the deposition and etching processes in which a material is deposited or etched from a substrate (such as in semi-conductor manufacture), other steps in semi-conductor manufacture, and the manufacture of medical products and devices.

Often, such gas flow control is achieved utilizing a mass flow controller ("MFC") for each of the gases being used in the process. The quantity or mass of gas being delivered to the process over any given period of time will be a function of the gas density. Therefore, at a given volume per unit time (i.e., volumetric flow rate), there will be less mass delivered to the process per unit time for a lighter or less dense gas, for example, helium, than with a heavier or denser gas, such as nitrogen or oxygen.

A number of patents have discussed the importance of accurate, consistent delivery of gases during industrial processes and the problems associated with proper calibration of mass flow controllers ("MFCs"), and have proposed solutions to improve MFCs. Among these patents are U.S. Pat. No. 6,564,824 to Lowery et al., U.S. Pat. No. 5,791,369 to Nishino et al., U.S. Pat. No. 6,152,162 to Balazy et al., and U.S. Pat. No. 6,138,708 to Waldbusser. U.S. Pat. No. 5,744,695, to Forbes, provides an apparatus that comprises a modification of an existing gas control panel, and that can provide for calibration checks of mass flow controllers. However, the '695 patent does not utilize a bypass loop, requires all gas flow to a process chamber to be ceased in order to check one gas, and is limited in its utility in other ways. These patents, and all other patent and non-patent references cited in this disclosure, are hereby incorporated by reference into this disclosure.

Typically a gas control system for an industrial process includes an MFC for each gas, and each such MFC is uniquely calibrated to the gas flowing through that controller. Thus, each MFC provides a readout, either analog or digital, that is unique to and representative of the gas flowing through the MFC.

To maintain the desired quality of the manufacturing process, for instance a deposition or etching process used in production of microprocessor chips, the MFCs must perform within a desired range of accuracy and must provide repeatable (i.e., precise) performance. Particularly, during ongoing production operations that involve many steps to produce a high-value product, it is critical to product quality and to production efficiency to quickly identify a particular MFC that is not performing within its operational specifications.

As discussed in the above-cited patent references, achieving the ongoing accurate and precise delivery of gas through a gas-metering device such as an MFC presents a challenge. This challenge is heightened when the temperature of that gas is elevated, as this imposes additional variability upon the gas-metering device during transition from its "cold start" (when most or all parts are at room or other low temperature) to an ultimate equilibrium operating temperature (after which time temperature changes for all components of the gas-metering device are not substantial). Further, even at the equilibrium operating temperature, the performance of the device may not be reliable if the device contains certain parts that are more subject to imparting performance inaccuracy at such elevated temperature.

Also, in current industrial process systems that combine a number of gases for a single process, verification of gas flow calibration can become very difficult. Even when flow tests are conducted to determine a drift from baseline, this approach might only be able to narrow down the source of the flow rate problem to two possible gases. For example, and not meant in any way to be limiting, in the processing to deposit a Silicon Germanium film, a step requires the simultaneous flow of both $GeH_4$ and silane or dicloro-silane (DCS). Here, $GeH_4$ is only acting as a dopant, and a film cannot be deposited with GeH4 alone. However, $GeH_4$ has significant impact on the deposition rate of the film. All other factors being equivalent, the greater is the flow of $GeH_4$, the faster is the deposition rate. However, when DCS is used in combination with $GeH_4$, an increase in DCS flow also will give an increased deposition rate. In such circumstance, if a higher than normal deposition rate is observed, the important question arises—is the $GeH_4$ flow high or is the DCS flow high? Traditional approaches to answering questions such as this one, such as a 'drift from baseline' approach, are inefficient as they result in a best-guess, or trial and error effort to solve a critical production-related problem.

Thus, there is a need to provide a better approach to calibration of MFC-controlled gases in industrial processes. None of the above-cited references have provided a bypass loop approach to calibration of MFCs. The present invention advances the present state of the art by providing an apparatus, method and system to easily, repeatedly, and reliably monitor and, if needed, adjust the performance of one or more MFCs that provide one or more gases to manufacturing processes.

SUMMARY OF THE INVENTION

The present invention provides new methods, apparatus and systems to determine the accuracy and/or precision of actual flow rates provided by mass flow controllers, in particular MFCs that are used to supply industrial processing facilities with a desired volumetric flow rate or a desired mass of gas per unit time. The present invention achieves this by providing a bypass loop in a vent line, where the bypass loop comprises a flow detector. In the bypass loop and elsewhere are appropriately placed valves to direct the flow of a particular gas from an MFC past this flow detector. Comparing the MFC-set rate of gas flow or mass per unit time with the actual rate passing the flow detector, based on data signals from the flow detector, permits an operator to calibrate the MFC as needed to bring its performance to within that MFC's relevant specified operational performance specifications.

Thus, one aspect of the present invention is a system of measuring and providing data with which to calibrate the flow rate of an MFC, where the system utilizes a bypass loop in a line through which the gas passes. The bypass loop has a flow detector therein which detects the flow or mass of gas passing per unit time, and data from this flow detector is used to calibrate the MFC flow rate.

In certain embodiments of the invention, the bypass loop is connected to a vent line of the industrial process. In other embodiments of the invention, the bypass loop is connected to a gas line leading to the process chamber of the industrial process, and in still other embodiments, the bypass loop has piping and valves that provide a means to receive gas from either the vent line or a gas line leading to the process chamber of the industrial process. As appropriate for a particular system, its MFCs' operational requirements, the functioning of the MFCs, embodiments of the present invention also may include compensating mechanisms downstream of the bypass loop, and in fluid communication with the bypass loop during operation of the present invention. These compensating mechanisms provide for adjustment of the downstream pressure or vacuum to approximate the pressure or vacuum to which the MFC is subject during its use in the process line. As needed, this is implemented to improve the accuracy and/or precision of the present invention.

The bypass loop quantitation and calibration methods that use the bypass loop apparatuses and system of the present invention are conducted one or more times per unit time of operation of the MFC in an industrial process. Alternately, these methods are conducted before or after an MFC provides a gas for use in the industrial process.

Another aspect of the present invention is the use of a computational device, such as a general purpose computer, that receives data signals from the flow detector and provides data output and data output summaries to operators of the industrial process. Further, the computational device additionally may be a computational control device, which has the capability to perform calculations based on data input from the flow detector, and/or other inputs, and based on the results of such calculations, to send control signals to an MFC, to one or more controllable valves, and/or to other device(s) in the industrial process.

Another aspect of the present invention includes programming for a computational device that computes and/or utilizes a Correction Factor to the actual MFC value in order to obtain the true gas flow. For example, once a Correction Factor value is obtained for a particular gas passing through a particular MFC, the computational device then calculates the adjustment required to that MFC. This aspect of the present invention improves performance accuracy when it is implemented in a real time feedback loop.

Another aspect of the present invention is the self-checking resulting from comparison of the single bypass MFC and each of the multiple gas-specific bypass MFCs. By ongoing or periodic comparison, after a sufficient number of comparisons, one can conclude which MFC is incorrect. For instance, and not meant to be limiting, if the bypass MFC is in need of adjustment, it will report that most or all gases examined need to be adjusted by the same relative value, and analysis of such comparison will lead to a conclusion of incorrect bypass MFC.

These and other advantages and features of the new methods, apparatuses and systems of the present invention will become apparent upon consideration of the following detailed description of the invention and the figures related thereto, and the appended claims.

BRIEF DESCRIPTION OF THE DRAWINGS

The features and advantages of the present invention will become apparent from the following detailed description of the invention when read with the accompanying drawings in which.

DETAILED DESCRIPTION OF THE INVENTION

As used throughout this specification, including the claims, the term "flow rate" or "gas flow rate" is meant to include, without being limited to, the rate of passage of a gas through a point in a conduit for the gas over a unit of time. For instance, a typical unit measurement of "flow rate" or "gas flow rate" that expresses this concept is liters per minute. That is to say, at a given pressure and temperature, x liters of gas pass a given point per minute. This term may be made more specific by stating it as the "volumetric flow rate." Mass flow controllers normally provide measurements in terms of the mass of a particular gas, and are calibrated to measure the flow of a single gas having a particular density. However, it is noted, particularly when used in the claims, that where the volumetric flow rate is not distinguished in the same phrase from the mass flow rate (such as is typically provided as the data output of a mass flow controller, that is, gas mass per unit time), that the broadest meaning of the terms "flow rate" or "gas flow rate" are taken to include the concept of mass flow rate.

As used throughout this specification, including the claims, the terms "quantitate," "quantitating," and "quantitation" are meant to include, without being limited to, a determination of the rate of passage of a gas, whether by volume or mass, using a second measurement means, such as a flow detector in a bypass loop of the present invention. The quantitation may be conducted by taking a single measurement using such flow detector, by taking a series of measurements within a fixed short period, such as one or five minutes, or by taking a number of measurements at certain time intervals, such as once per two hours. Standard mathematical and statistical treatments of the data from such measurements are made, such as averaging, determination of standard deviation, variation and the like, and estimates of precision likewise may be conducted as part of the quantitation process. Such quantitation as used herein falls within the broader terms "measure," "measuring," and "measurement."

As used throughout this specification, including the claims, a flow detector for measurement of a gas flow flowing through a bypass loop of the present invention may be so described in this longhand, and is exemplified by the more specific terms "mass flow controller" ("MFC") or a "digital mass flow controller" ("DMFC"). Alternate equivalent shorthands for such-positioned flow detectors are "bypass MFC" and "bypass DMFC."

As used throughout this specification, including the claims, a flow controller for control of a gas flow flowing from a specific, typically single, source of gas may be referred to as a "dedicated" flow detector. For example, an MFC that controls a single gas in a production line is referred to as a "dedicated MFC."

As used throughout this specification, including the claims, the term "calibrate" and "calibration" are meant to include, without being limited to, a: 1) a determination of the difference in flow rate measurements taken by a flow detector in a bypass loop of the present invention (i.e., a bypass MFC) and the setting on a dedicated MFC for which those measurements were taken, such determination resulting in the calculation of a correction ratio or percentage adjustment of the readings on the MFC; 2) an adjustment of the analog or digital readout of flow rate on the MFC itself, to compensate for the difference defined in #1; 3) an adjustment of the mechanism that physically controls the passage of gas through the MFC, the result of which brings the analog or digital readout of flow rate on the MFC to within a desired tolerance of the flow rate as determined by the bypass loop flow detector for the relevant period of evaluation; or 4) any other means known in the art to provide a correction to the MFC flow rate to bring it into a desired tolerance of the flow rate as determined by the bypass loop flow detector for the relevant period of evaluation.

As used throughout this specification, including the claims, the term "computational device" is meant to include, without being limited to, a dedicated programmed circuit (including, but not limited to, an integrated circuit or a microprocessor that is capable of receiving data signals from one or more sources; a programmable general purpose computational device, such as a computer, that is capable of receiving data signals from one or more sources, and a programmable special-purpose computational device, such as a computer, that is capable of receiving data signals from one or more sources. As used throughout this specification, including the claims, the term "computational control device" is meant to include, without being limited to, an integrated circuit or a microprocessor; a programmable general purpose computational device, such as a computer, and a programmable special-purpose computational device, such as a computer, that is capable of sending control signals to one or more destinations.

Referring to the drawings, it is noted that like reference numerals represent like parts throughout the various figures. As used throughout this disclosure, a vent line is an alternative path for the gas flowing from one or more MFCs, where another path for the gas is the process line leading to one or more process chambers. Also, as shown in specific embodiments described herein, the bypass loop includes appropriate valving and a flow detector, such as a digital mass flow controller or other device capable of detecting the mass (or volume) of gas passing through the device per unit time.

Figure 1:
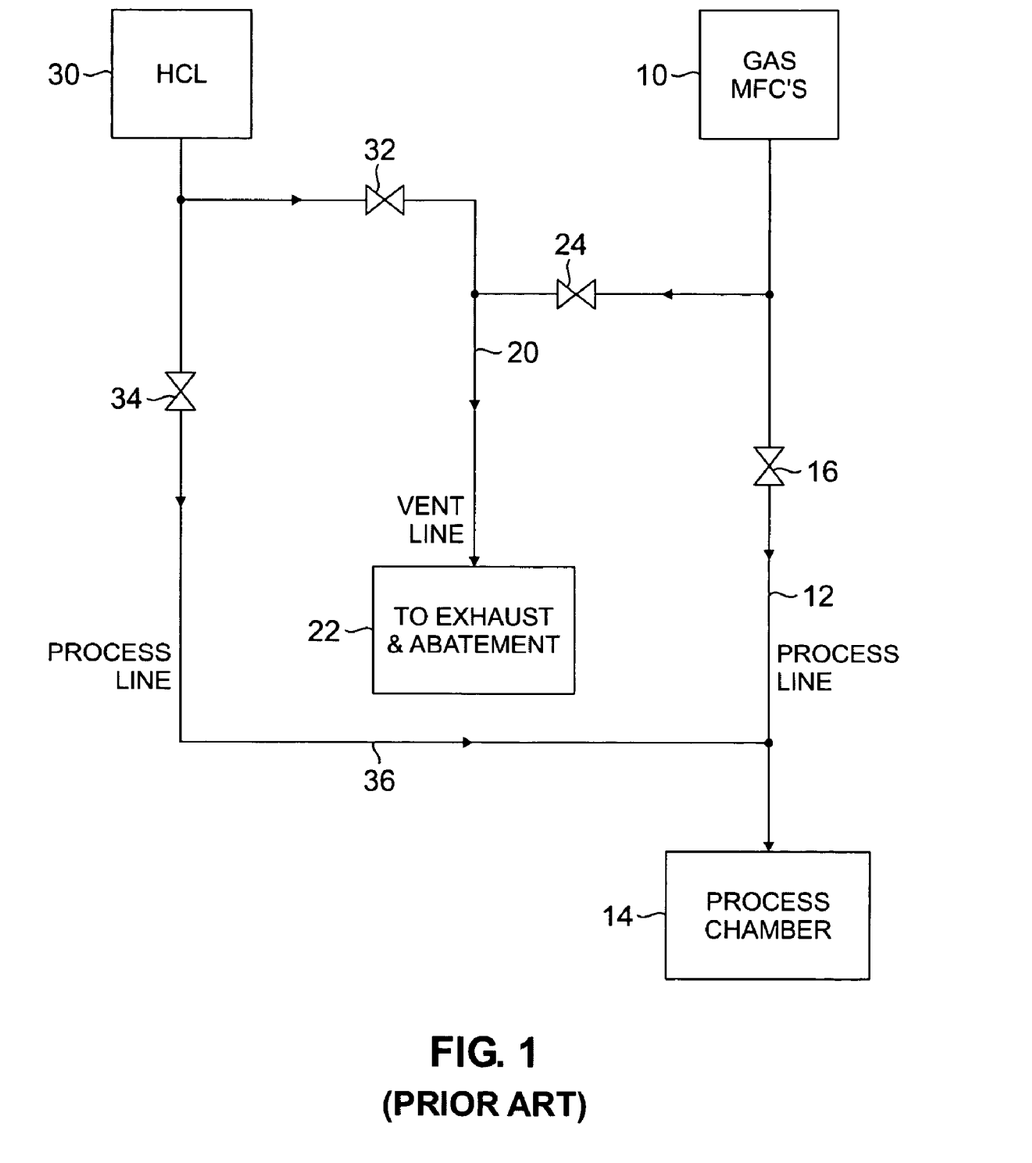
FIG. 1 is a schematic illustration of a prior art standard configuration of gas and other lines that are typical of a deposition system for production of semiconductor chips on silicon wafers.

FIG. 1 provides a schematic representation of a standard configuration of gas and other lines that are typical of a deposition system for production of semiconductor chips on silicon wafers. A plurality of gas supplies (not shown) are controlled as to mass (or volume) flow rate over time by gas mass flow controllers, collectively shown as 10 in FIG. 1. Gas from these MFCs can pass through the process line, 12, to the process chamber, 14, when valve 16 is open and valve 24 is closed. Gas from these MFCs can pass through the vent line, 20, to the exhaust and abatement system, 22, when valve 24 is open and valve 16 is closed. Also shown is an acid storage tank, 30, an acid-to-vent valve, 32, and acid-to-process valve, 34, and the acid-to-process line, 36, which, as the name implies, provides passage for acid from the acid storage tank, 30, to the process chamber, 14. All valves indicated in this figure are shown as pneumatic valves, but actually may be manual valves, or may be a combination of manual, pneumatic, solenoid-actuated, or any other type known and used in the art.

Figure 2:
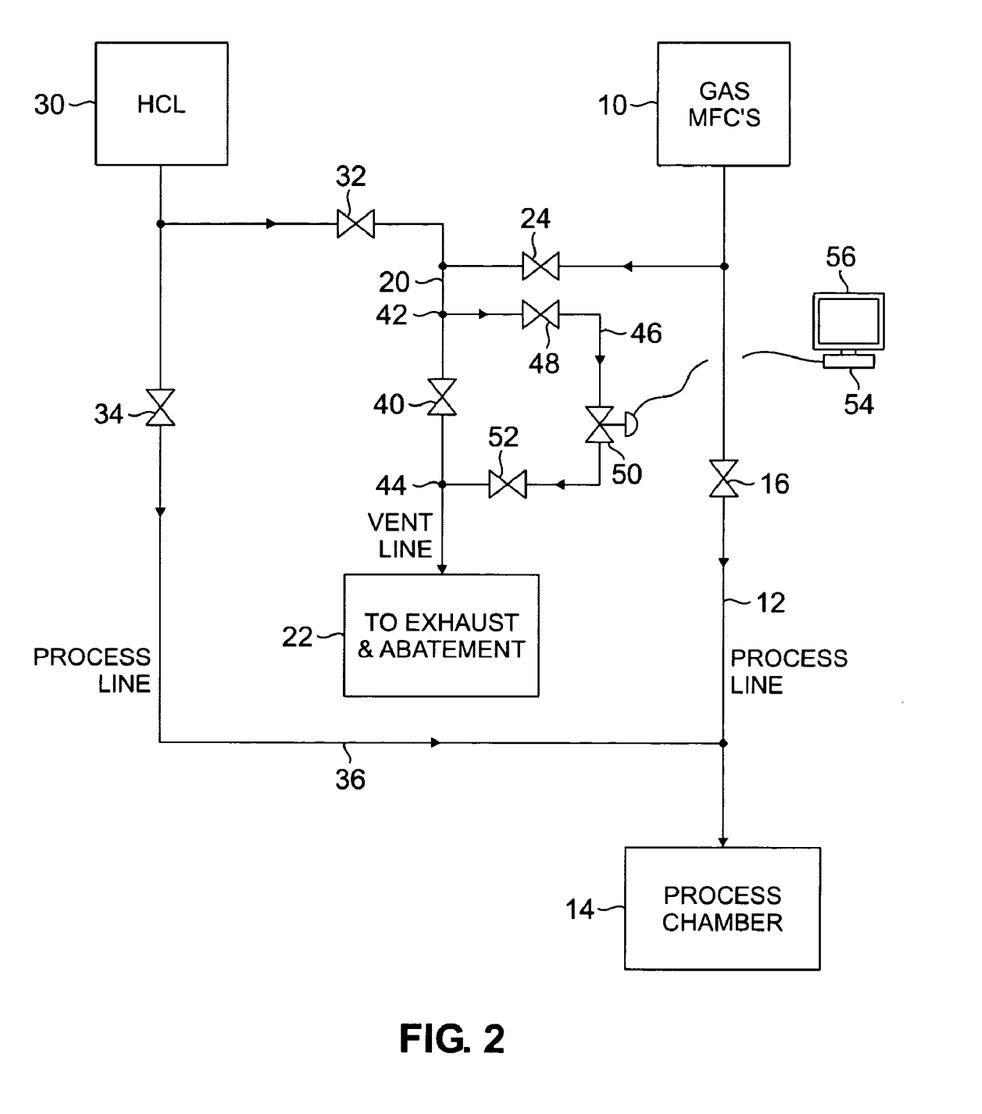
FIG. 2 is a schematic illustration of a configuration providing an embodiment of the present invention imposed into the prior art configuration of FIG. 1, providing a bypass loop connecting to the vent line.

FIG. 2 provides a schematic representation of a configuration providing one embodiment of the present invention. As in FIG. 1, this provides a configuration of gas and other lines that are typical of a deposition system for production of semiconductor chips on silicon wafers. Also as in FIG. 1, a plurality of gas supplies (not shown) are controlled as to flow or mass rate over time by gas MFCs, collectively shown as 10 in FIG. 1. Gas from these MFCs can pass through the process line, 12, to the process chamber, 14, when process line control valve 16 is open and valve 24 is closed. Gas from these MFCs can pass through the vent line, 20, to the exhaust and abatement system, 22, when valve 24 is open and valve 16 is closed. Also shown is an acid storage tank, 30, an acid-to-vent valve, 32, and acid-to-process valve, 34, and the acid-to-process line, 36, which, as the name implies, provides passage for acid from the acid storage tank, 30, to the process chamber, 14. All valves indicated in this figure may be all of one type, such as pneumatic or manual valves, or may be a combination of manual, pneumatic, solenoid-actuated, or any other type known and used in the art.

In addition to the above typical piping and valve controls, the embodiment depicted in FIG. 2 has a main vent line shut-off valve, 40, that is positioned between an intake junction, 42, and an return junction, 44, of bypass loop 46. The bypass loop, 46, comprises a first bypass control valve, 48, positioned between said intake junction and a flow detector, 50. The bypass loop, 46, also comprises a second bypass control valve, 52, positioned between said flow detector, 50, and said return junction, 44.

Data signals generated by gas flow passing through flow detector, 50, are communicated to a computational control device, 54, that has associated with it a data output means, here shown as a computer monitor screen, 56. Other data output means includes, but is not limited to, a Statistical Process Control ("SPC") chart which provides for daily performance review. The communication of data signals from flow detector, 50, to the computational control device, 54, and beyond is by standard electrical signal transmission through a conducting wire, or by other means known to those of ordinary skill in the art. That is, such signals can be communicated by conventional means, such as by sending electrical impulses along a copper wire, by more complex means, such as by converting the signals into radio waves and transmitting these waves such that a receiver receives the signals and thereafter sends them to the integrated circuit, microprocessor, special-purpose computer, or general purpose computer, or by any other way now known or later developed.

In certain embodiments, the computational control device is a dedicated personal computer which collects data from the flow detector, 50, and transmits this data to an SPC chart for daily performance review. Thus, the data from the flow detector, 50, not only provides a real time calibration means to compensate and correct one or more MFCs, it also provides historical data which can be utilized in product quality analyses and after-the-fact troubleshooting to help determine likely contributing factors to changes in product quality.

Also, in certain embodiments, the flow detector, 50, is a digital mass flow controller ("DMFC"). This provides the advantages of: lower total variation over the range of measurement compared to conventional analog MFCs; and, for many models, faster response time is faster and smaller hysteresis. A suitable digital mass flow controller for use in the present invention is the Aera FM-D880-4V. This is a 1 slm N2 MFC. It is appreciated that other embodiments of the present invention may use a MFC calibrated for a different gas or rated for a higher or lower flow. Such variations in hardware and initial calibrations depend to an extent on the process application, and are within the scope of the presently claimed invention.

One advantage of the design, apparatus, method and system of the present invention is the use of an automated computational program that applies a correction factor to the real time reading of the gas flow in the Bypass MFC to accommodate the difference between the actual gas density and the gas density the Bypass MFC for which the bypass MFC is calibrated. The program in turn provides the operator with such corrected ("true") gas flow for each specific gas used in the system, based on the implementation of the correction factor. In certain embodiments, the computational control device that applies such correction factor also is used to develop and update the correction factors through ongoing or periodic comparisons between the bypass flow detector (i.e., a bypass MFC or a bypass DMFC) and a number of dedicated gas MFCs.

One advantage of this design, apparatus, method and system of the present invention is the availability of real time gas flow verification without having to conduct special process films either in the process line or elsewhere. Another advantage of the ability to quickly evaluate the accuracy and/or precision of MFCs is the lessening or elimination of trial and error replacement of MFCs or other parts when a problem in process operational parameters is detected, or when a problem with intermediate product quality or end product quality is detected.

Regarding another aspect of the present invention, for certain systems and MFCs, the accuracy and/or the precision of the determination of the flow rate by the bypass loop flow detector, 50, may be adversely affected by difference between the back pressure or vacuum existing when a particular MFC is "on line" and supplying gas to the process line, and the back pressure or vacuum existing when the flow rate of that MFC is being evaluated by use of the present bypass loop apparatus, system and method. For instance, under operating conditions when supplying gas to the process line, an MFC is subject to a vacuum of 20 mm mercury, or to a back pressure of 100 pounds per square inch ("psi") above ambient. However, there is not an equivalent back pressure (or vacuum, as the case may be) downstream of the flow detector in the bypass loop during its measurements of flow rate of that MFC (i.e., the only "back pressure" is ambient pressure, for instance 14.7 psi at sea level). Depending on the flow rate mechanisms and performance characteristics of the MFC, such differences in back pressure may impart error in what is intended to provide a correction factor or calibration.

Accordingly, when such factors are considered relevant and back pressure correction is desired, any number of methods of establishing a sufficiently equivalent back pressure to the bypass loop flow detector may be implemented. For example, without being limited, the known back pressure or vacuum in effect during online use is entered into a back pressure/vacuum compensator, and such compensator applies that back pressure or vacuum downstream of the bypass loop flow detector during evaluation of that MFC. Mechanisms for the establishment of a back pressure system are provided, for example in U.S. Pat. No. 5,131,929 to Brockman et al., and U.S. Pat. No. 6,584,803 to Oakey.

Figure 3:
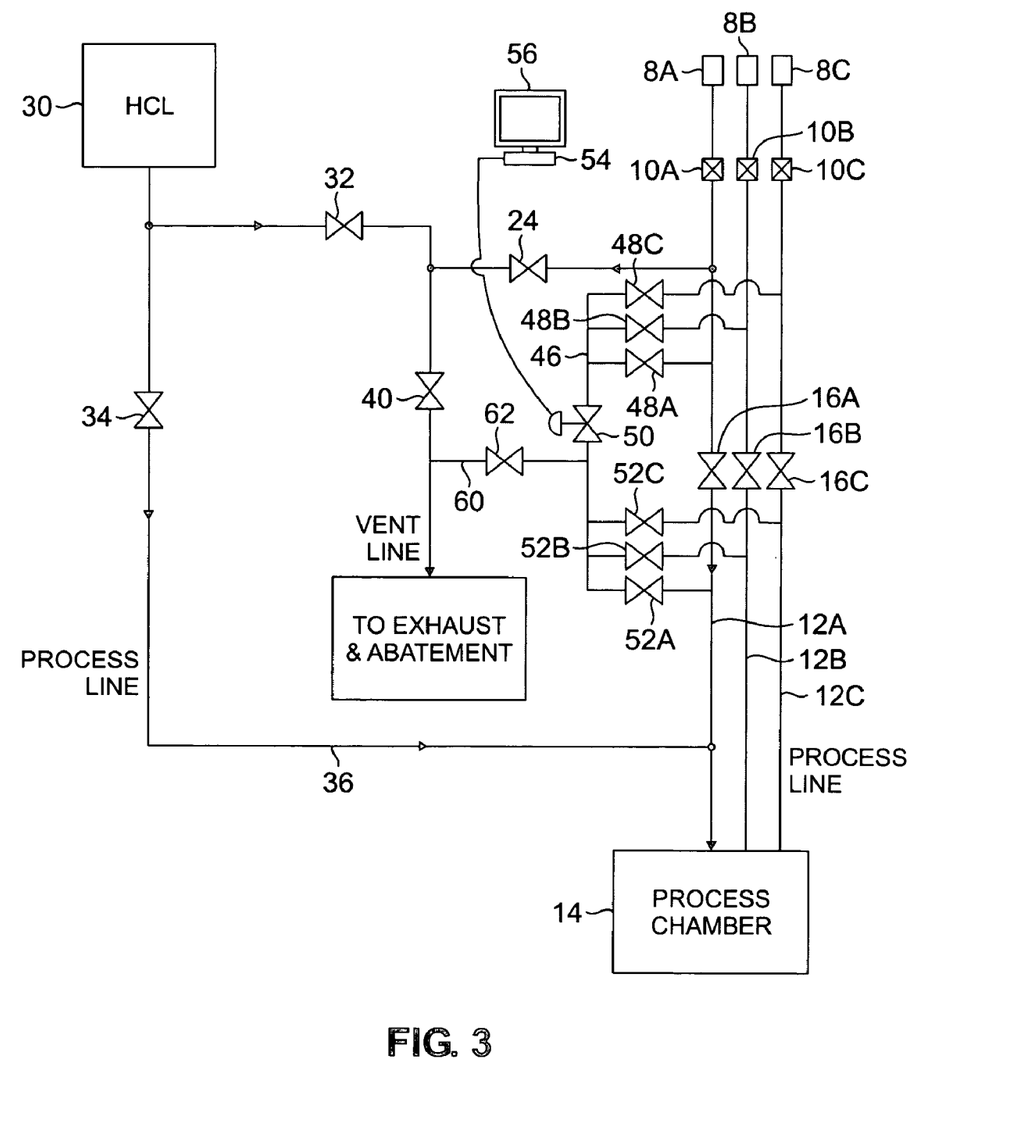
FIG. 3 is a schematic illustration of a configuration providing an embodiment of the present invention, providing a process line and process line valve for each gas supply, and a bypass loop in fluid communication with each gas supply's process line, and with the vent line.

Another approach to achieving this back pressure compensation is to provide a bypass loop of the present invention leading from and to the process line itself, and to take readings through the bypass loop during actual use of the MFC and its gas during operations. FIG. 3 provides one embodiment of this approach. Shown in FIG. 3 are three separate process lines, 12A, 12B and 12C, each having respective MFCs, 10A, 10B and 10C, controlling three different gases from respective gas supplies 8A, 8B and 8C. Each such process line is independently operated first bypass control valves, 48A, 48B and 48C, which control the respective fluid communication between the respective process lines and the fluid detector, 50, of bypass loop 46. Likewise, independently operated second bypass control valves, 52A, 52B, and 52C, can turn off or one respective fluid communication between the respective process lines and the fluid detector, 50, of bypass loop 46, and are meant to serve as a means to control the return of a respective gas to its respective process line. Also shown are three process line control valves, 16A, 16B and 16C. Finally, to provide an alternative to return to process lines, a bypass to vent line, 60, with a bypass to vent valve, 62, is provided to direct gases after detection by flow detector, 50, to the vent line, 20, from which the gases flow to exhaust and abatement systems, 22. Other features of the system are as described for previous figures.

Thus, taking as an example the bypass loop measurement of gas flow from MFC10B when that gas is being used in process chamber 14, valves 48A, 48C, 52A, and 52C remain closed, valves 48B and 52B are opened, and valve 16B is closed. This directs gas controlled by MFC10B past flow detector 50 in bypass loop 46. The measurement of the gas flow is the same as described above for other embodiments and configurations, and the flow data signals are communicated to the computational control device, 54, that has associated with it a data output means, here shown as a computer monitor screen, 56. Data signals are treated as described above, to quantitate or to calibrate MFC 10B.

Then, one alternative is to return the gas to process line 16B downstream of valve 16B, which is closed. In such alternative the gas is subject to back pressure or vacuum conditions typical of standard operating conditions when this gas is being used. Under certain sets of conditions, this serves to provide a more representative flow rate determination by flow detector 50.

Alternately, as appropriate for a particular gas and process line, the gas after measurement by flow detector 50 in bypass loop 46 is directed to the vent line by opening the bypass to vent valve, 62, and by keeping all second bypass control valves in their closed positions. Under such alternative, typically valve 40 is closed, or both valves 24 and 32 are closed, to eliminate a chance of interference with other flows.

When the period for the gas flow determination is ended, the gas flow of gas 8B is returned to its normal path by opening valve 16B and closing valves 48B and 52B. (This assumes a during-process determination. Of course, the same apparatus is used to quantitate or to calibrate an off-line MFC, i.e., one not currently being used to supply gas to the process chamber.)

That is, when the configuration of the apparatus shown in FIG. 3, when back pressure or vacuum are not of concern (for instance when control by the MFCs are not subject to variation as a result of back pressure or back vacuum), the measurement of a gas controlled by an MFC can take place when it is not in use in the process chamber 14. In such operation the gas is directed past the flow detector 50 of the bypass loop 46, and is directed thereafter to the vent line 20 by opening valve bypass to vent valve, 62, which is located along bypass to vent line, 60.

It is noted that the embodiments depicted in FIGS. 2 and 3 provide the means to conduct rapid quantitation or calibration procedures whether or not the gas of interest is being used in a process.

Also, it is noted that manifolds may be provided for any places where a number of different valves are described above, and automation of such valves or manifolds may be implemented without departing from the scope of the present invention. Such designs and operations thereof are known to those of ordinary skill in the art.

Thus, to summarize certain aspects and embodiments of the present invention, in one embodiment of the present invention, the method begins when an operator of the system (whether a person or computerized device) determines that measurement of the flow rate for gas from an MFC is to be made. The operator, whether by manual or automated means, closes a valve along the vent line (or process line, for embodiments analogous to FIG. 3, above) that lies between the intake and return junctions of the bypass loop. This directs all gas flow in the vent line (or respective process line, for embodiments analogous to FIG. 3, above) through the bypass loop. One or more valves in the bypass loop are opened, so that a flow detector positioned in the bypass loop detects all gas that is flowing through the vent line. A particular gas and a specific flow rate for that gas is set by the operator, that flow rate is input (or already has been input) into the MFC being evaluated, and gas flow as controlled by that MFC flows through piping to the vent line (that route being made by appropriate valve or manifold adjustment between the gas source and the bypass loop).

Thus, all gas flow released by the MFC is directed to the vent line and detected by the flow detector in the bypass loop. This, in essence, allows real time calibration of the MFC by comparison to the flow detector in the bypass loop. In preferred embodiments, data signals from the bypass loop flow detector are communicated to a dedicated computer, which provides data output that includes a comparison of the flow or mass rate set into, or requested of, the MFC, and the flow or mass rate as determined by the bypass loop flow detector. The operator, or others, review any deviations between the desired rate and the rate detected by the bypass loop flow detector. A determination is made if a correction, or compensation, is to be made at the MFC to bring to an appropriate level of conformity to the rate measured at the bypass loop flow detector. Such correction, or compensation, is made if so determined to be required. Such correction or compensation may be in the form of a calibration of the MFC, or in a quantitation that is recognized and implemented when programming the flow rate from that MFC.

Then, if desired, the flow or mass rate is determined again at the bypass loop flow detector. This is a confirmatory check on the appropriateness of the correction, or compensation, in view of imprecision in adjustments of the MFC, or other variables that may made such corrections or compensations non-linear. After a desired number of confirmatory checks (which could be none), the valving is returned to normal positions, so that vent line gas does not flow through the bypass loop.

Also, when a bypass loop assessment of MFC flow rate accuracy and/or precision is made either before or during process chamber use of the gas being controlled by the MFC, the valving may be adjusted to provide that gas is directed to the process line instead of shutting the flow off after the check. Thus, as described above, and as is realizable upon consideration of desired sequences by one of ordinary skill when considering use of the present invention for a particular MFC and process system a range of alternative sequences are possible under the methods of the present invention.

Further, an existing facility can be modified to add an apparatus and system of the present invention in order to practice the method of the present invention. For instance, and not to be limiting, an existing HT AMAT EPI Centura deposition system for production of semi-conductors has pneumatic valves in positions designated as valves 16, 24, 32 and 34 in FIGS. 1 and 2. Manual valves 40, 48 and 52, as depicted in FIG. 2, are added to the system, as is bypass loop 46 and flow detector 50, in the form of a digital mass flow controller. This digital mass flow controller is connected to a dedicated personal computer that receives data signals from the digital mass flow controller and makes appropriate calculations based on algorithms, in order to provide a comparison of the MFC-set and the flow detector-determined flow rates. Optionally, the data from this flow detector, i.e., the digital mass flow controller, which is collected by the dedicated personal computer is sent to an SPC chart for daily performance review. As indicated for or suggested by methods disclosed for embodiments above, when the measurements are completed by the flow detector in the bypass loop, in order to place the MFC and system back in normal operating mode, the manual valves are simply closed and opened in the reverse order from the sequence that was used to initiate the bypass loop measurements.

Also, based on the design and operating conditions of a particular process facility, it may be important to measure gas flow in the bypass loop at a specific pressure. In such circumstance, a valve as described in the above disclosure may be substituted for a check valve, a pressure release valve, or for a flow direction indicator and a system to open or close certain valves based on a signal from such flow direction indicator. For instance, if a back pressure of a certain quantity is desired when measuring gases of a particular system, an adjustable-pressure pressure release valve can be placed downstream of the bypass loop flow detector. Then, if, for instance, flow is to measured only when the back pressure is 50 psi, and the adjustable-pressure pressure release valve is set to this pressure, pressure will build upstream of this valve until 50 psi is attained, then the valve will open to maintain approximately 50 psi, during which time flow measurements are made by the bypass loop flow detector.

Also, based on the design and operating conditions of a particular process facility, it may be appropriate to modify the piping, the valving and the control system to include the ability to purge specific gas lines with an inert gas, such as nitrogen. This is readily achievable while practicing the present invention using designs and techniques known to those of ordinary skill in the art.

Thus, while the preferred embodiments of the present invention have been shown and described herein, it is apparent that such embodiments are provided by way of example only. Numerous variations, changes, substitutions and modifications will occur to those of ordinary skill in the art without departing from the invention herein. Accordingly, it is intended that the invention be limited only by the spirit and scope of the appended claims.

We claim as our invention:

1. A system to measure a gas flow rate of a gas supplied from a mass flow controller to a process chamber via a process line, the system comprising:

a. a mass flow controller;
b. a process chamber;
c. a process line providing a direct passage for said gas between said mass flow controller and said process chamber through a process line control valve;
d. a vent line fluidly connecting to said process line at a junction between said mass flow controller and said process line control valve, and having a main vent line shut-off valve;
e. a bypass loop extending between an inlet junction and a return junction that fluidly connect the bypass loop to the vent line, wherein the main vent line shut-off valve is disposed between the inlet junction and the return junction, said bypass loop comprising
  a. a flow detector adapted to provide a measurement of said gas flow rate as said gas, supplied from the mass flow controller, flows through both said flow detector and said bypass loop;
  b. a first bypass control valve between said inlet junction and said flow detector; and
f. a computational control device that receives data signals from said flow detector;
whereby said gas while flowing through said bypass loop provides for said measurement of said mass flow controller's gas flow rate which provides information for quantitation or for calibration of said mass flow controller.

2. The system of claim 1, wherein said flow detector is a bypass mass flow controller.

3. The system of claim 1, wherein said bypass loop additionally comprises a second bypass control valve between said flow detector and said return junction.

4. The system of claim 1, additionally comprising a manifold fluidly connecting two or more mass flow controllers to said vent line, whereby valving control of the manifold provides gas from any one of said two or more mass flow controllers to said vent line for said measurement.

5. The system of claim 1, additionally comprising a back pressure or a back vacuum compensating system to provide a back pressure or a back vacuum to the flow detector in the bypass loop that is representative of the back pressure or back vacuum existing the said process chamber during use of said gas.

6. The system of claim 1, wherein said bypass loop additionally comprises a pressure release valve between said flow detector and said return junction.

7. A system to measure a gas flow rate for a gas provided from a dedicated means for metering, the system comprising:
  a dedicated means for metering;
  a process chamber;
  a process line providing a direct passage for said gas between said dedicated means for metering and said process chamber through a process line valve;
  a vent line fluidly connecting to said process line at a junction between said dedicated means for metering and said process line valve;
  a bypass loop formed and extending between an inlet junction and a return junction fluidly connected to the vent line, said bypass loop comprising
    a first means to control a gas flow flowing through said bypass loop, located between said inlet junction and a means for measuring; and
    said means for measuring the gas flow flowing through said bypass loop, wherein said means for measuring is adapted to provide a measurement of said gas flow rate as said gas flows through both the means for measuring and the bypass loop;
  a means to direct gas through either the process line or the vent line; and
  a computational control device that receives data signals from said means for measuring a gas flow: whereby said gas while flowing through said bypass loop fluidly connecting to said process line provides for said measurement of said flow rate of said gas through said dedicated means for metering which provides information for quantitation or for calibration of said dedicated means for metering.

8. The system of claim 7, wherein said measurement is repeated over time and is used to quantify the gas flow rate passing through said dedicated means for metering.

9. The system of claim 7, additionally comprising at least one additional dedicated means for metering at least one additional gas.

10. The system of claim 9, wherein a comparison between set and measured flow rates of two or more of said dedicated means for metering, by said means for measuring a gas flow flowing through said line, provides a correction factor for said means for measuring a gas flow flowing through said line.

11. A method to calibrate a flow of gas to a process chamber that is set by a mass flow controller, comprising the steps of: providing a vent line, terminating in an exhaust and/or abatement system, that joins a process line between a mass flow controller and a process line control valve upstream of a process chamber, providing a bypass loop intersecting the vent line at an inlet junction and a return junction and comprising a flow detector adapted to provide a measurement of a calibrating gas flow as said calibrating gas flow flows through both said flow detector and said bypass loop, a main vent line shut-off valve positioned between the inlet junction and the return junction; setting the mass flow controller to a specific gas flow rate; adjusting the process line control and main vent line shut-off valves to direct a calibrating gas flow from said mass flow controller through the vent line and into the bypass loop through the inlet junction; measuring a bypass loop gas flow rate of said calibrating gas flow with said flow detector; comparing said bypass loop gas flow rate to said desired gas flow rate; and calculating a relationship between said bypass loop gas flow rate and said desired gas flow rate whereby said relationship provides information to quantitate or to calibrate said mass flow controller, or to replace or to repair said mass flow controller.

12. A system to measure a gas flow rate from a plurality of mass flow controllers, the system comprising:
  a process chamber;
  a plurality of mass flow controllers each supplying a gas to the process chamber through a respective process line providing a direct passage for said gas between the respective mass flow controller and said process chamber through a respective process line valve;
  a bypass loop comprising a flow detector and fluidly connected to a vent line through a bypass to vent line having a bypass to vent valve;
  a plurality of first bypass control valves, each provided between a junction in one of the plurality of process lines, the junction between a respective mass flow controller and a respective process line valve, and the bypass loop;
  a plurality of second bypass control valves, each provided between a junction in one of the plurality of process lines, the junction between a respective process line valve and the process chamber, and the bypass loop; and a computational control device that receives data signals from the flow detector; wherein the bypass loop is adapted to receive a selected gas from one of the plurality of mass flow controllers through a respective first bypass control valve, the flow detector adapted to provide a measurement of said gas flow rate as said gas flows through the flow detector, and wherein said selected gas while flowing through said bypass loop provides for said measurement of said mass flow controller's gas flow rate which provides information for quantitation or for calibration of said mass flow controller, wherein sequential comparison of gas flow rates by the bypass loop flow detector and each of two or more of the mass flow controllers provides for a determination of possible error or defect in one of the mass flow controllers, and wherein the selected gas flow leaving the bypass loop may be directed to the process chamber through the respective second bypass control valve, or, as an alternative option, may be directed through the valved bypass to the vent line for exhaust and/or abatement.

13. The system of claim 12, wherein said flow detector is a bypass mass flow controller.

* * * * *